United States Patent
Blasko

(10) Patent No.: US 8,259,474 B2
(45) Date of Patent: Sep. 4, 2012

(54) PULSE WIDTH MODULATION CONTROL OF A MATRIX CONVERTER

(75) Inventor: Vladimir Blasko, Avon, CT (US)

(73) Assignee: Otis Elevator Company, Farmington, CT (US)

( * ) Notice: Subject to any disclaimer, the term of this patent is extended or adjusted under 35 U.S.C. 154(b) by 388 days.

(21) Appl. No.: 12/600,147

(22) PCT Filed: May 16, 2007

(86) PCT No.: PCT/US2007/011680
§ 371 (c)(1),
(2), (4) Date: Nov. 13, 2009

(87) PCT Pub. No.: WO2008/140457
PCT Pub. Date: Nov. 20, 2008

(65) Prior Publication Data
US 2011/0043273 A1    Feb. 24, 2011

(51) Int. Cl.
*H02M 1/12* (2006.01)
(52) U.S. Cl. ............ 363/41; 363/127; 318/802
(58) Field of Classification Search ........... 318/774, 318/779, 747, 811, 599, 118, 807; 363/34–46, 363/89, 98, 132, 127, 159, 56.02, 65; 323/270, 323/272, 276, 303, 239, 290; 290/44, 55
See application file for complete search history.

(56) References Cited

U.S. PATENT DOCUMENTS

| | | | |
|---|---|---|---|
| 4,758,938 A | 7/1988 | Kanazawa | |
| 5,153,821 A | 10/1992 | Blasko | |
| 5,657,216 A * | 8/1997 | Kaura | 363/41 |
| 5,892,677 A * | 4/1999 | Chang | 363/152 |
| 6,014,323 A * | 1/2000 | Aiello et al. | 363/71 |
| 6,130,832 A | 10/2000 | Julian | |
| 6,163,472 A | 12/2000 | Colby | |
| 6,166,930 A | 12/2000 | Czerwinski | |
| 6,636,693 B2 | 10/2003 | Blasko | |
| RE38,439 E | 2/2004 | Czerwinski | |
| 6,771,524 B2 | 8/2004 | Miguchi | |

(Continued)

FOREIGN PATENT DOCUMENTS

GB    2429799 A    3/2007

(Continued)

OTHER PUBLICATIONS

Kang, Jun-Koo et al., "The Matrix Converter Drive Performance Under Abnormal Input Voltage Conditions," IEEE, 2001, pp. 1089-1095.*

(Continued)

*Primary Examiner* — Rajnikant Patel
(74) *Attorney, Agent, or Firm* — Kinney & Lange, P.A.

(57) ABSTRACT

A matrix converter includes a plurality of switching elements and is adapted to receive a multi-phase alternating current (AC) input signal having an input frequency and to generate a multi-phase AC output signal having an output frequency. The phases of the input signal are sorted as a function of their instantaneous voltage amplitude (60). A reference signal is generated from output reference voltages that correspond to each phase of the output signal (56). Duty cycles are calculated for each phase of the output signal based on the sorted input signal phases and the reference signal (62). Switching functions, which each control one of the switching elements, are then generated based on the duty cycles for each phase of the output signal (64, 66).

26 Claims, 4 Drawing Sheets

U.S. PATENT DOCUMENTS

| | | | |
|---|---|---|---|
| 6,882,550 | B1 | 4/2005 | Baumgart |
| 6,924,993 | B2 * | 8/2005 | Stancu et al. ............... 363/41 |
| 7,148,660 | B2 | 12/2006 | Ghosh et al. |
| 7,187,149 | B1 | 3/2007 | Balog, Jr. et al. |
| 7,710,082 | B2 * | 5/2010 | Escobar Valderrama et al. ............... 323/207 |
| 2003/0137855 | A1 | 7/2003 | Miguchi |
| 2004/0027843 | A1 | 2/2004 | Mahlein et al. |

FOREIGN PATENT DOCUMENTS

| | | |
|---|---|---|
| JP | 2007006564 | 1/2007 |

OTHER PUBLICATIONS

Clare, J.C., et al., "The Effects of Sampling Delays and Non-Ideal Filtering on the Performance of Matrix Converter 3 Modulation Algorithms," Power Electronics and Variable Speed Drives, Sep. 18-19, 2000, Conference D Publication No. 475 copyright IEE 2000, pp. 29-34.*

Rossi, C., et al., Cascaded Multilevel Inverter Modulation Strategies: a Novel Solution Based on Duty-Cycle Space Vector Approach, IEEE ISIE 2005, Jun. 20-23, 2005, Dubrovnik, Croatia, pp. 733-738.*

Kang, Jun-Koo et al., "Analysis and Evaluation of Bi-Directional Power Switch Losses for Matrix Converter Drive," IEEE, 2002, pp. 438-443.

Clare, J.C., et al., "The Effects of Sampling Delays and Non-Ideal Filtering on the Performance of Matrix Converter Modulation Algorithms," Power Electronics and Variable Speed Drives, Sep. 18-19, 2000, Conference Publication No. 475 copyright IEE 2000, pp. 29-34.

Narayanan, G., et al., "Triangle-Comparison Approach and Space Vector Approach to Pulsewidth Modulation in Inverter fed Drives,".

Watanabe, Eiji, et al., "High Performance Motor Drive Using Matrix Converter," XP-002468757, The Institution of Electrical Engineers, 2000, pp. 7/1-7/6.

Satish, T., et al., Modulation Methods Based on a Novel Carrier-Based PWM Scheme for Matrix Converter Operation Under Unbalanced Input Voltages, Department of Electrical and Computer Engineering University of Minnesota, 2006, IEEE.

Watanbe, Eiji, et al., "High Performance Motor Drive Using Matrix Converter," 2000, The Institute of Electrical Engineers, printed and published by the IEE, London.

Milanovic, Miro, et al., "Unity Input Displacement Factor Correction Principle for Direct AC to AC Matrix Converters Based on Modulation Strategy," IEEE Transactions on Circuits and Systems—Part 1: Fundamental Theory and Applications, vol. 47, No. 2, Feb. 2000.

Huber, Laszio, et al., Space Vector Modulator for Forced Commutated Cycloconverters, Institute for Power and Electronic Engineering, Yugoslavia, 1989, IEEE.

Oyama, Jun et al., "Displacement Angle Control of Matrix Converter," Department of Electrical Engineering and Computer Science, Japan, 1997, IEEE.

The International Search Report in counterpart foreign application PCT/US2007/011680 filed May 16, 2007.

* cited by examiner

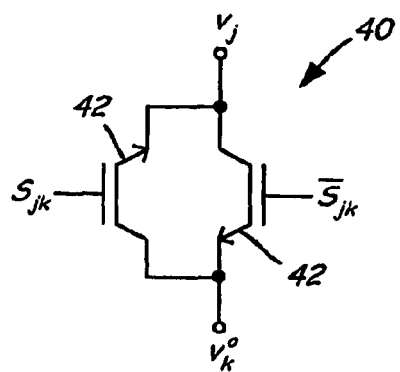
FIG. 2A
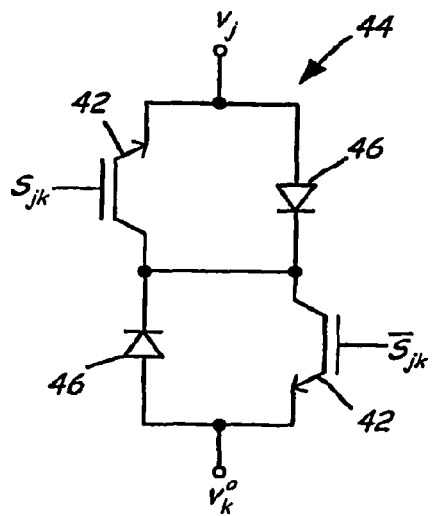 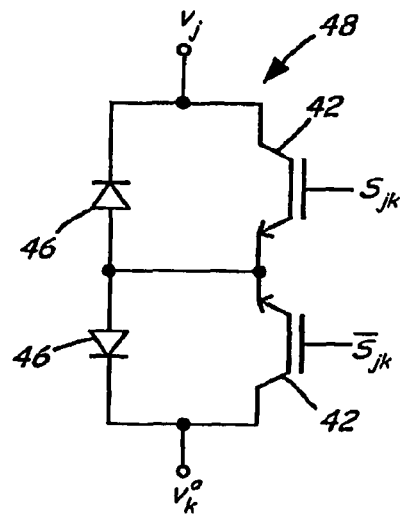
FIG. 2B    FIG. 2C

US 8,259,474 B2

PULSE WIDTH MODULATION CONTROL OF A MATRIX CONVERTER

BACKGROUND

The present invention relates to power systems. More specifically, the present invention relates to a pulse width modulation control method for a matrix converter or direct frequency changer.

A matrix converter is an electronic device that converts AC voltage of one frequency at its input to AC voltage of a different frequency at its output. The matrix converter may also change the amplitude and the number of phases between the input signal and the output signal. The matrix converter includes a plurality of switching devices that are controlled by pulse width modulation (PWM) to provide voltages in a single phase or multiple phases at the output of the matrix converter. The number of switching devices in the matrix converter is a function of the number of phases in the input and output lines. PWM changes the connections of the switches between the input and the output of the matrix converter such that the locally averaged output voltages follow reference voltages.

One application for a matrix converter is controlling the speed and torque of an AC motor. In this application, the matrix converter receives an AC input signal (for example, a three-phase signal from an electrical utility) and converts the input signal to a single phase or multi-phase output signal having a frequency and amplitude that is compatible with the AC motor. However, many control algorithms for converting the input signal to the appropriate output signal are very complicated and consume a large amount of processor resources. In addition, the incorporation of a matrix converter into a motor control system often necessitates complex control hardware, which increases the cost of the system.

SUMMARY

The present invention relates to control of a matrix converter including a plurality of switching elements. The matrix converter is adapted to receive a multi-phase alternating current (AC) input signal having an input frequency and to generate a multi-phase AC output signal having an output frequency. The phases of the input signal are sorted as a function of their instantaneous voltage amplitude. A reference signal is generated from output reference voltages that correspond to each phase of the output signal. Duty cycles are calculated for each phase of the output signal based on the sorted input signal phases and the reference signal. Switching functions, which each control one of the switching elements, are then generated based on the duty cycles for each phase of the output signal.

BRIEF DESCRIPTION OF THE DRAWINGS

FIG. 2A-2C are schematics of switching elements suitable for use in the matrix converter shown in FIG. 1.

DETAILED DESCRIPTION

Figure 1:
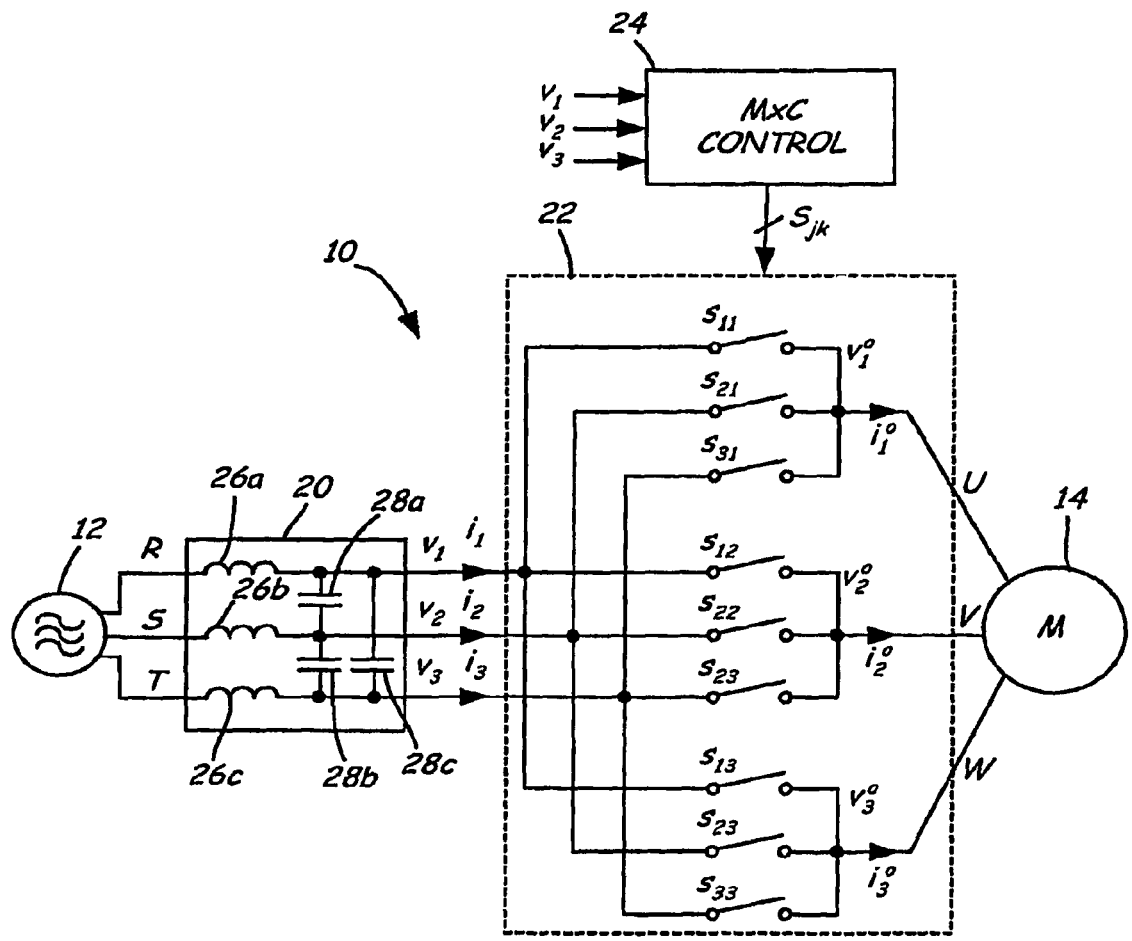
FIG. 1 is a schematic of a power system including a matrix converter with a plurality of switching elements and a controller for operating the switching elements.

FIG. 1 is a schematic view of power system 10, which receives multi-phase alternating current (AC) power from power supply 12 at an input frequency and provides multi-phase AC power to a load at an output frequency. Power system 10 includes LC filter 20, matrix converter 22, and matrix converter (MxC) controller 24. In the embodiment shown, power supply 12 is a three-phase power supply (including input phases R, S, and T) that provides input voltages $v_1$, $v_2$, and $v_3$ and supplies input currents $i_1$, $i_2$, and $i_3$ at the inputs of matrix converter 22. Also in the embodiment shown, matrix converter 22 provides three-phase power (including phases U, V, and W) to induction motor 14, including output voltages $v_1^o$, $v_2^o$, and $v_3^o$ and output currents $i_1^o$, $i_2^o$, and $i_3^o$.

LC filter 20 includes inductors 26a, 26b, and 26c, and capacitors 28a, 28b, and 28c. Inductor 26a is connected in series with input phase R, inductor 26b is connected in series with input phase S, and inductor 26c is connected in series with input phase T. Capacitor 28a is connected across input phases R and S, capacitor 28b is connected across input phases S and T, and capacitor 28c is connected across input phases R and T. LC filter 20 controls the current levels and prevents voltage transients from power supply 12.

Matrix converter 22 includes switching elements $s_{11}$, $s_{21}$, $s_{31}$, $s_{12}$, $s_{22}$, $s_{32}$, $s_{13}$, $s_{23}$, and $s_{33}$ (collectively referred to as switches $s_{jk}$). Switching elements $s_{jk}$ are bi-directional switches that are connected to power supply 12 via LC filter 20 such that input voltage $v_1$ is received on the input node of switching elements $s_{11}$, $s_{12}$, and $s_{13}$, input voltage $v_2$ is received on the input node of switching elements $s_{21}$, $s_{22}$, and $s_{23}$, and input voltage $v_3$ is received on the input node of switching elements $s_{31}$, $s_{32}$, and $s_{33}$. The output node of switching elements $s_{11}$, $s_{21}$, and $s_{31}$ is connected to provide output voltage $v_1^o$ to motor 14, the output node of switching elements $s_{12}$, $s_{22}$, and $s_{32}$ is connected to provide output voltage $v_2^o$ to motor 14, and the output node of switching elements $s_{13}$, $s_{23}$, and $s_{33}$ is connected to provide output voltage $v_3^o$ to motor 14. White matrix converter 30 is shown receiving three-phase power at its input and providing three-phase power at its output, it will be appreciated that matrix converter 22 can be adapted to receive power from power supply 12 having any number of phases and to provide power to motor 14 with any number of phases.

MxC controller 24 is connected to each of switching elements $s_{jk}$ to provide switching functions $S_{jk}$ that operate switches $s_{jk}$ to provide output signals to motor 14 at an output frequency. In other words, MxC controller 24 operates switching elements $s_{jk}$ to convert the frequency of the input signal from power supply 12 to an output frequency that is compatible with motor 14. MxC controller 24 receives input voltages $v_1$, $v_2$, and $v_3$ as inputs and generates the switching function $S_{jk}$ based on these inputs. The algorithm employed to develop the switching functions will be described in more detail below.

FIG. 2A-2C are schematics of devices suitable for switching elements $s_{jk}$ in matrix converter 22. Each of the devices receives input voltage $v_j$ on its input node and provides output voltage $v_k^o$ on its output node. Each of the devices is controlled by a switching function $S_{jk}$ and its complement $\overline{S}_{jk}$, which are provided by MxC controller 24. FIG. 2A shows device 40 including transistors 42 connected in an anti-parallel configuration (emitter to collector), with reverse blocking capability. FIG. 2B shows device 44 including transistors 42 connected in a common collector configuration. Each transistor 42 in device 44 is connected to a diode 46 in an anti-parallel configuration to provide opposite conductivity between each transistor 42 and diode 46. FIG. 2C shows device 48 including transistors 42 connected in a common emitter configuration. Each transistor 42 in device 48 is connected to a diode 46 in an anti-parallel configuration to provide opposite conductivity between each transistor 42 and diode 46. In some embodiments, transistors 42 in FIGS. 2A, 2B, and 2C are insulated gate bipolar transistors (IGBTs). It should be noted that devices 40, 44, and 48 are merely exemplary, and any device capable of controllable to provide bi-directional switching between two nodes may be employed for switching elements $s_{jk}$.

Transistors 42 in devices 40, 44, and 48 may be controlled by pulse width modulation (PWM) signals, which provide pulses to the gates of transistors 42 to control current flow through them. The gating pulses may be modeled by switching functions $S_{jk}$, which assume values of "1" when switching element $s_{jk}$ is closed (i.e., conducting) and "0" when switching element $s_{jk}$ is open. If an inductive load is provided at the output of matrix converter 22 (such as inductive motor 14), one of switching elements $s_{jk}$ needs to be in a conduction state at any given time. In addition, to avoid a short circuit between input phases R, S, and T, no two switching elements $s_{jk}$ may be conducting at the same time. These constraints may be expressed as:

$$\sum_{j=1}^{n} S_{jk} = 1; k = 1, m. \quad (1)$$

From Equation 1, it follows that for a given k, there are only n−1 independent switching functions $S_{jk}$. Thus, the number of switching functions $S_{jk}$ may be reduced from n×m to (n−1)×m switching functions.

As is shown in FIG. 1, the output signal for each output phase U, V, and W is generated by controlling three switching elements $s_{1k}$, $s_{2k}$, and $s_{3k}$, corresponding to the three-phase input power from power supply 12. Thus, the 3×3 matrix converter 22 shown in FIG. 1 can be viewed as three converters each including three input phases and a single output phase having a signal based on control of switching elements $s_1$, $s_2$, and $s_3$. The output voltage $v^o$ from a three-phase input and single phase output matrix converter is:

$$v^o(t) = [S_1(t) \ S_2(t) \ S_3(t)] \begin{bmatrix} v_1(t) \\ v_2(t) \\ v_3(t) \end{bmatrix}. \quad (2)$$

Using local averaging over a short sampling interval $T_s$ and assuming that input voltages $v_1$, $v_2$, and $v_3$ are constant over sampling interval $T_s$, Equation 2 can be written as:

$$v^o = d_1 v_1 + d_2 v_2 + d_3 v_3 \quad (3)$$

where $d_1$, $d_2$, and $d_3$ are duty cycle functions defined as $d_{1,2,3} = T_{1,2,3}/T_s$. $T_s$ is the sum of time intervals $T_1$, $T_2$, and $T_3$, which correspond to the times that switching elements $s_1$, $s_2$, and $s_3$, respectively, are conducting, and $v^o$ is the locally averaged output voltage. Thus, Equation 1 may expressed in terms of duty cycles as:

$$d_1 + d_2 + d_3 = 1, \quad (4)$$

where $0 \leq d_1, d_2, d_3 \leq 1$. Equation 4 shows that output voltage $v^o$ is a function of two of the duty cycle functions, since the third duty cycle function can be calculated from two known duty cycle functions.

Duty cycle functions $d_1$, $d_2$, and $d_3$ may be employed not only to control output voltage $v^o$, but also to provide additional criteria related to the distribution of output current $i^o$ over particular input phases in one sampling interval. In particular, input currents $i_1$, $i_2$, and $i_3$ are related to output current $i^o$ in that $$d_1 i^o = i_1; \ d_2 i^o = i_2; \ d_3 i^o = i_3 \quad (5)$$

The ratio of two locally averaged contributions from output current $i^o$ to input currents $i_1$, $i_2$, and $i_3$, may be selected to follow the desired ratio of phase shifted input voltages $v_1$, $v_2$, and $v_3$, to control the displacement factor. This can be accomplished by introducing a current distribution factor a to the duty cycle functions, wherein current distribution factor a may be defined as:

$$a = \frac{i_2}{i_3} = \frac{d_2}{d_3} = \frac{v_2^*}{v_3^*}, \quad (6)$$

where voltages $v_2^*$ and $v_3^*$ are phase angle reference voltages. Voltages $v_2^*$ and $v_3^*$ may be generated by a phase-locked loop (PLL) system such that they are in phase with input voltages $v_2$ and $v_3$, respectively.

To reduce the number of unknown duty cycles from three to two, Equation 4 may be expressed as $d_1 = 1 - (d_2 + d_3)$, and substituted into Equation 3:

$$v^o - v_1 = d_2(v_2 - v_1) + d_3(v_3 - v_1). \quad (7)$$

Furthermore, Equation 6 may be expressed as $d_2 = ad_3$ and substituted into Equation 7 and rewritten to provide an expression for $d_3$:

$$d_3 = \frac{v^o - v_1}{(v_3 - v_1) + a(v_2 - v_1)}. \quad (8)$$

With $d_3$ calculated to meet output voltage and input power factor demands, the remaining duty cycle functions $d_1$ and $d_2$ may be calculated backward from Equations 4 and 7.

Figure 3:
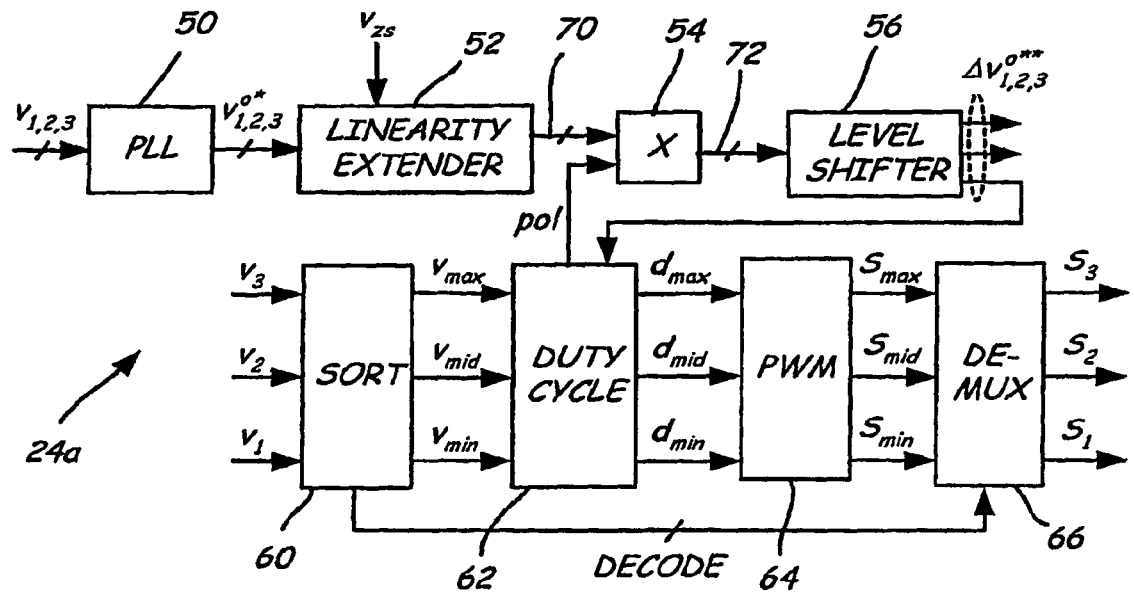
FIG. 3 is a block diagram of the controller for generating switching functions for the plurality of switching elements from the input signals.

FIG. 3 is a block diagram of a portion of MxC controller 24 (referred to as MxC controller portion 24a) for generating switching functions $S_1$, $S_2$, and $S_3$ for switching elements $s_1$, $s_2$, and $s_3$. MxC controller portion 24a is an embodiment of a system that generates switching functions pursuant to the constraints outlined above. MxC controller portion 24a includes phase-locked loop (PLL) module 50, linearity extender module 52, signal polarity module 54, level shifter module 56, sorting module 60, duty cycle module 62, pulse width modulation (PWM) module 64, and de-multiplexing module 66. Each of the modules of MxC controller portion 24a may be implemented in hardware, software, firmware, or combinations thereof. In order to provide output signals for all three output phases U, V, and W of MxC controller 24, three MxC controller portions 24a may be connected in parallel to the input phases from power supply 12.

PLL module 50 receives input voltages $v_1$, $v_2$, and $v_3$ at its inputs and provides output reference voltages $v_1^{o*}$, $v_2^{o*}$, and $v_3^{o*}$ to linearity extender 52. Linearity extender module 52 provides signals 70 to signal polarity module 54 based on output reference voltages $v_1^o$, $v_2^{o*}$ and $v_3^o$ and zero sequence signal $v_{zs}$. Signal polarity module 54 provides signals 72 to level shifter module 56 based on the signal from linearity extender module 52 and polarity signal pol from duty cycle module 62. Level shifter module 56 generates modified output reference voltages $\Delta v_1^{o}$, $\Delta v_2^{o}$, and $\Delta v_3^{o**}$, and one of these modified output reference voltages are provided as an input to duty cycle module 62.

Sorting module 60 also receives input voltages $v_1$, $v_2$, and $v_3$ at its inputs and generates sorted voltage signals $v_{min}$, $v_{mid}$, and $v_{max}$ at its output and provides a decoding signal to de-multiplexing module 66. Duty cycle module 62 generates duty cycle signals $d_{min}$, $d_{mid}$, and $d_{max}$ from sorted voltage signals $v_{min}$, $v_{mid}$, and $v_{max}$. PWM module 64 generates switching functions $S_{min}$, $S_{mid}$, and $S_{max}$ from duty cycle signals $d_{min}$, $d_{mid}$, and $d_{max}$, and de-multiplexing module 66 provides output switching functions $S_1$, $S_2$, and $S_3$ based on switching functions $S_{min}$, $S_{mid}$, and $S_{max}$ and the decoding signal from sorting module 60.

Sorting module 60 receives input voltages $v_1$, $v_2$, and $v_3$ and sorts them as a function of their instantaneous voltage amplitudes. Input voltages $v_1$, $v_2$, and $v_3$ are sorted such that $v_{max}$ is the input phase with the highest amplitude, $v_{min}$ is the phase with lowest amplitude, and $v_{mid}$ is the phase with an amplitude intermediate $v_{max}$ and $v_{min}$. Signals $v_{max}$, $v_{mid}$, and $v_{min}$ are provided at the outputs of sorting module 60 and the inputs of duty cycle module 62. Sorting module 60 also provides a decoding signal to de-multiplexing module 66 that associates sorted input voltages $v_{min}$, $v_{mid}$, and $v_{max}$ with their originating input voltages $v_1$, $v_2$, and $v_3$.

PLL module 50 also receives input voltages $v_1$, $v_2$, and $v_3$ at its inputs and generates output reference voltages $v_1^{o*}$, $v_2^{o*}$, and $v_3^{o*}$ at its outputs. Output reference voltages $v_1^{o*}$, $v_2^{o*}$, and $v_3^{o*}$ are phase-locked with input voltages $v_1$, $v_2$, and $v_3$, respectively. Output reference voltages $v_1^{o*}$, $v_2^{o*}$, and $v_3^{o*}$ are provided to linearity extender module 52 which extends the linearity of output reference voltages $v_1^{o*}$, $v_2^{o*}$, and $v_3^{o*}$. The linearity of output reference voltages $v_1^{o*}$, $v_2^{o*}$, and $v_3^{o*}$ may be extended by adding a zero sequence signal $v_{zs}$ having a specific waveform and amplitude to reduce the peaks of output reference voltages $v_1^{o*}$, $v_2^{o*}$, and $v_3^{o*}$. In some embodiments, the zero sequence signal $v_{zs}$ is the third harmonic of one of output reference voltages $v_1^{o*}$, $v_2^{o*}$, and $v_3^{o*}$. With proper selection of zero sequence signal $v_{zs}$, the linearity of output reference voltages $v_1^{o*}$, $v_2^{o*}$, and $v_3^{o*}$ can be extended by a factor of $2/\sqrt{3}$, or up to 15.4%.

After zero sequence signal $v_{zs}$ has been added to output reference voltages $v_1^{o*}$, $v_2^{o*}$, and $v_3^{o*}$, signals 70 are provided to polarity module 54. Polarity module 54 receives a polarity signal pol from duty cycle module 62 that has a value of "1" when sorted input voltage $v_{mid}$ is zero or positive, and a value of "−1" when sorted input voltage $v_{mid}$ is negative. The signals from linearity extender 52 are multiplied by polarity signal pol, which assures that the criterion $0 \leq d_1, d_2, d_3 \leq 1$ set forth above is satisfied.

Figure 4:
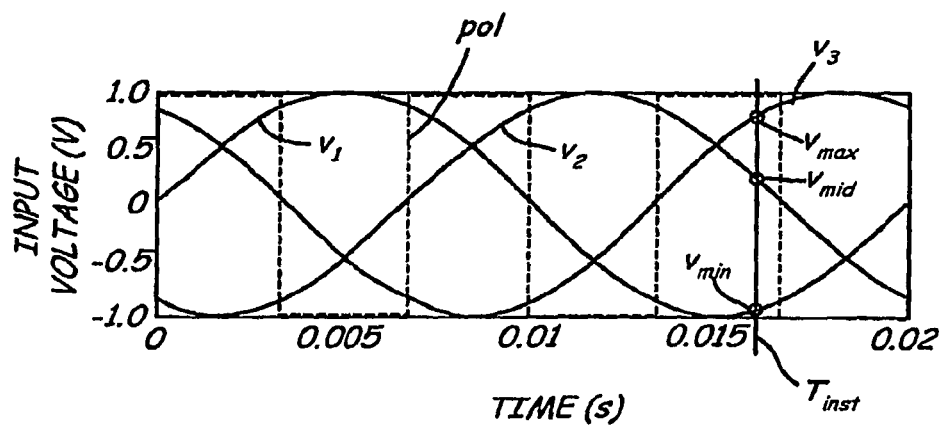
FIG. 4 is a graph showing the input signals sorted according to their instantaneous values.

FIG. 4 is a graph that illustrates the relationship between sorted input voltages $v_{min}$, $v_{mid}$, and $v_{max}$ and polarity signal pol. Input voltages $v_1$, $v_2$, and $v_3$ are plotted versus time, and input voltages $v_1$, $v_2$, and $v_3$ are phase shifted by about 120° with respect to each other. Line poi shows that the value of polarity signal pal changes as the polarity of the input voltage with the intermediate amplitude changes. For example, at instantaneous time $T_{inst}$ sorting module 60 sorts input voltages $v_1$, $v_2$, and $v_3$ such that $\{v_1, v_2, v_3\} = \{v_{min}, v_{mid}, v_{max}\}$, and polarity signal pol has a value pol=1 because $v_{mid} \geq 0$.

Referring back to FIG. 3, polarity module 54 provides the polarity adjusted output reference voltages $v_1^{o*}$, $v_2^{o*}$, and $v_3^{o*}$ (i.e., signals 72) to level shifter module 56. Level shifter module 56 scales and shifts the signals to provide modified output voltages $\Delta v_1^{o}$, $\Delta v_2^{o}$, and $\Delta v_3^{o}$ having an amplitude of up to about 86.6% of input voltages $v_1$, $v_2$, and $v_3$, respectively. One of modified output reference voltages $\Delta v_1^{o}$, $\Delta v_2^{o}$, and $\Delta v_1^{o}$ is provided to duty cycle module 62 for use in calculating duty cycle functions $d_1$, $d_2$, and $d_3$.

Duty cycle module 62 receives sorted input voltages $v_{min}$, $v_{mid}$, and $v_{max}$ and one of modified output reference voltages $\Delta v_1^{o}$, $\Delta v_2^{o}$, and $\Delta v_3^{o**}$ and generates duty cycles $d_{min}$, $d_{mid}$, and $d_{max}$. The duty cycles for a sampling interval $T_s$ are calculated pursuant to the following table. Signals $v_{min}^*$, $v_{mid}^*$, and $v_{max}^*$ are phase-locked sorted input reference voltages $v_{min}$, $v_{mid}$, and $v_{max}$, respectively, $\alpha$ is the current distribution factor described above, and $\Delta V^o$ is the reference signal provided by level shifter module 56 to duty cycle module 62.

TABLE 1

| If $v_{mid} \geq 0$, pol = 1 | If $v_{mid} < 0$, pol = −1 |
|---|---|
| $\Delta V_1 = v_{mid} - v_{min}$ | $\Delta V_1 = v_{max} - v_{mid}$ |
| $a = \dfrac{v_{mid}^*}{v_{max}^*}$ | $a = \dfrac{v_{mid}^*}{v_{min}^*}$ |
| $\Delta V^o = v^o - v_{min}$ | $\Delta V^o = -(v^o - v_{max})$ |
| $\Delta V_h = v_{max} - v_{min}$ | $\Delta V_h = v_{max} - v_{min}$ |
| $\Delta V = \Delta V_h + a\Delta V_1$ | $\Delta V = \Delta V_h + a\Delta V_1$ |
| $d_h = \dfrac{\Delta V^o}{\Delta V}$; $d_1 = ad_h$; $d_{mid} = d_1$ | $d_h = \dfrac{\Delta V^o}{\Delta V}$; $d_1 = ad_h$; $d_{mid} = d_1$ |
| $d_{min} = 1 - (d_1 + d_h)$ | $d_{min} = d_h$ |
| $d_{max} = d_h$ | $d_{max} = 1 - (d_1 + d_h)$ |

Figure 5A:
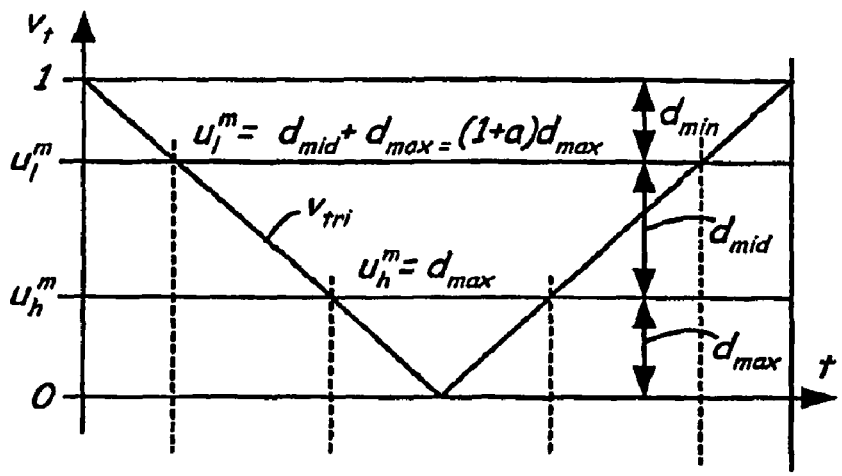
FIG. 5A is a graph of a triangle comparison signal for generating pulse width modulation functions.

After duty cycle functions $d_{min}$, $d_{mid}$, and $d_{max}$ are calculated, PWM module 64 generates modulation functions $u_h^m$ and $u_l^m$ that are a function of duty cycle functions $d_{min}$, $d_{mid}$, and $d_{max}$. In some embodiments, $u_l^m = d_{mid} + d_{max} = (1+a)d_{max}$ and $u_h^m = d_{max}$. PWM module 64 compares modulation functions $u_h^m$ and $u_l^m$ to a triangular carrier signal of known frequency to generate the switching functions for switching elements $s_1$, $s_2$, and $s_3$. FIG. 5A is a graph showing triangle carrier signal $v_{tri}$ with duty cycle functions $d_{min}$, $d_{mid}$, and $d_{max}$ and modulation functions $u_h^m$ and $u_l^m$ plotted on the graph.

Figure 5B:
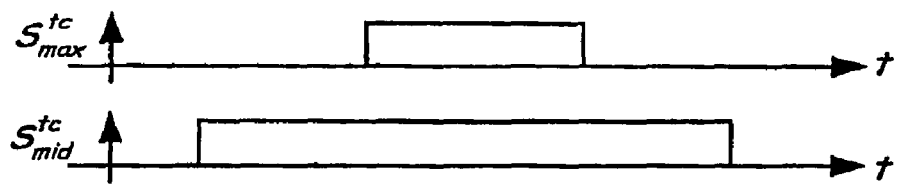
FIG. 5B is a graph of intermediate switching functions generated by a triangle comparison method.

The comparison of modulation functions $u_h^m$ and $u_l^m$ to triangle carrier signal $v_{tri}$ generates intermediate switching functions $S_{max}^{tc}$ and $S_{mid}^{tc}$. FIG. 5B is a graph showing the waveforms for intermediate switching functions $S_{max}^{tc}$ and $S_{mid}^{tc}$. Intermediate switching function $S_{max}^{tc}$ has a logic "1" value when triangle carrier signal $v_{tri}$ is less than $u_h^m$ and a logic "0" value at all other times. Intermediate switching function $S_{mid}^{tc}$ has a logic "1" value when triangle carrier signal $v_{tri}$ is less than $u_l^m$ and a logic "0" value at all other times.

Figure 5C:
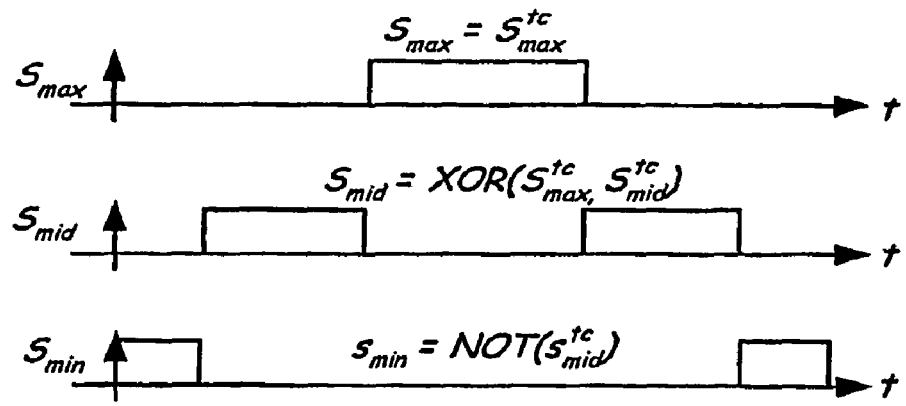
FIG. 5C is a graph of switching functions derived from the intermediate switching functions for controlling the switching elements of the matrix controller.

FIG. 5C is a graph of switching functions $S_{min}$, $S_{mid}$, and $S_{max}$, which are derived from the intermediate switching functions $S_{max}^{tc}$ and $S_{mid}^{tc}$. Switching functions $S_{min}$, $S_{mid}$, and $S_{max}$ are derived as follows:

$$S_{max} = S_{max}^{tc}$$

$$S_{mid} = XOR(S_{max}^{tc}, S_{mid}^{tc})$$

$$S_{min} = NOT(S_{mid}^{tc})$$

Logic gates may be connected to conventional triangle comparison hardware to generate switching functions $S_{min}$, $S_{mid}$, and $S_{max}$ from intermediate switching functions $S_{max}^{tc}$ and $S_{mid}^{tc}$.

Figure 5D:
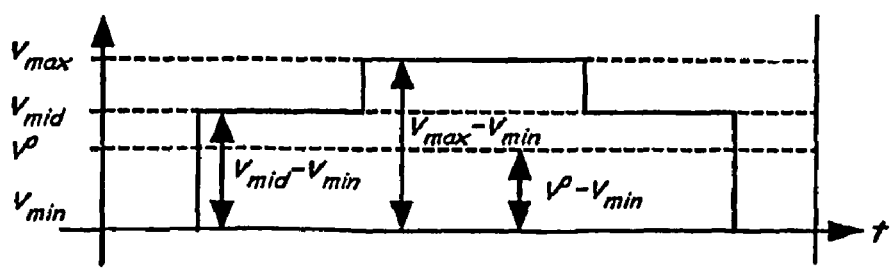
FIG. 5D is a graph of an output voltage waveform for a phase of the matrix converter output.

Switching functions $S_{min}$, $S_{mid}$, and $S_{max}$ are then provided to de-multiplexing module 66, which associates switching functions $S_{min}$, $S_{mid}$, and $S_{max}$ with switching elements $s_1$, $s_2$, and $s_3$ based on the decoding signal provided by sorting block 60. Thus, switching function $S_1$ is provided to switching element $s_1$, switching function $S_2$ is provided to switching element $s_2$, and switching function $S_3$ is provided to switching element $s_3$. FIG. 5D is a graph of the waveform generated switching functions $S_1$, $S_2$, and $S_3$ control switching elements $s_1$, $s_2$, and $s_3$, respectively, when $v_{mid} \geq 0$. The output voltage $v^o$ for MxC controller portion 24a is the locally averaged contributions of $v_{min}$, $v_{mid}$, and $v_{max}$.

In summary, the present invention relates to control of a matrix converter including a plurality of switching elements. The matrix converter is adapted to receive a multi-phase alternating current (AC) input signal having an input frequency and to generate a multi-phase AC output signal having an output frequency. The phases of the input signal are sorted as a function of their instantaneous voltage amplitude. A reference signal is generated from output reference voltages that correspond to each phase of the output signal. Duty cycles are calculated for each phase of the output signal based on the sorted input signal phases and the reference signal. Switching functions, which each control one of the switching elements, are then generated based on the duty cycles for each phase of the output signal.

Although the present invention has been described with reference to preferred embodiments, workers skilled in the art will recognize that changes may be made in form and detail without departing from the spirit and scope of the invention.

The invention claimed is:

1. A method for controlling a matrix converter including a plurality of switching elements, the matrix converter adapted to receive a multi-phase alternating current (AC) input signal having an input frequency and to generate a multi-phase AC output signal having an output frequency, the method comprising:
  sorting the phases of the input signal as a function of instantaneous voltage amplitude of the input signal phases;
  generating a reference signal from output reference voltages that correspond to each phase of the output signal;
  calculating a current distribution factor based upon polarity of an intermediate input phase voltage and phase-locked input reference voltages;
  calculating duty cycles functions for each phase of the output signal based on the sorted input signal phases, the current distribution factor, and the reference signal; and
  generating switching functions based on the duty cycle function for each phase of the output signal, wherein each switching function controls one of the switching elements.

2. The method of claim 1, wherein sorting the phases of the input signal comprises associating each of the sorted input signal phases with the input signal phase from which it originated.

3. The method of claim 2, and further comprising:
  associating each of the switching functions with a switching element based on the associations of the sorted input signal phases with the originating input signal phases.

4. The method of claim 1, wherein generating the reference signal comprises:
  adding a zero sequence signal to each of the output reference voltages to provide modified output reference voltages; and
  selecting one of the modified output reference voltages as the reference signal.

5. The method of claim 4, wherein adding the zero sequence signal comprises selecting the zero sequence signal to extend a linearity of the switching functions by about 15.4%.

6. The method of claim 4, wherein generating the reference signal further comprises scaling and shifting the output reference voltage signals after adding the zero sequence signal to provide output signal voltages having amplitudes of about 86.6% of corresponding input signal voltages.

7. The method of claim 1, wherein generating switching functions comprises:
  calculating modulation functions based on the duty cycles for each phase of the output signal;
  comparing the modulation functions to a trianglular comparison signal; and
  generating the switching functions based on the comparison between the modulation functions and the triangular signal.

8. A method for controlling a matrix converter including a plurality of switching elements, the matrix converter adapted to receive an alternating current (AC) input signal having an input frequency with phase voltages $v_1$, $v_2$, and $v_3$ and to generate a multi-phase AC output signal having an output frequency, the method comprising:
  sorting input phase voltages $v_1$, $v_2$, and $v_3$ as a function of their instantaneous amplitudes such that $v_{max}$ is the input phase voltage with the highest amplitude, $v_{min}$ is the input phase voltage with lowest amplitude, and $v_{mid}$ is the input phase voltage with an amplitude intermediate $v_{max}$ and $v_{min}$;
  generating a reference signal from output reference voltages that correspond to each phase of the output signal;
  calculating a current distribution factor based upon polarity of $v_{mid}$ and phase-locked input reference voltages;
  calculating duty cycle functions $d_{min}$, $d_{mid}$, and $d_{max}$ based on input phase voltages $v_{min}$, $v_{mid}$, and $v_{max}$, respectively, the current distribution factor, and the reference signal;
  calculating modulation functions based on duty cycle functions $d_{min}$, $d_{mid}$, and $d_{max}$ for each output signal phase;
  comparing the modulation functions to a triangular comparison signal; and
  generating switching functions $s_{min}$, $s_{mid}$, and $s_{max}$ based the comparison between the modulation functions and the triangular comparison signal, wherein each of switching functions $s_{min}$, $s_{mid}$, and $s_{max}$ controls one of the switching elements associated with an output phase.

9. The method of claim 8, wherein sorting phases $v_1$, $v_2$, and $v_3$ comprises associating each of $v_{max}$, $v_{mid}$, and $v_{min}$ with one of the input phase voltages $v_1$, $v_2$ and $v_3$ from which it originated.

10. The method of claim 9, and further comprising:
  associating each of switching functions $s_{min}$, $s_{mid}$, and $s_{max}$ with a switching element based on the associations of sorted phase voltages $v_{max}$, $v_{mid}$, and $v_{min}$ with input phase voltages $v_1$, $v_2$, and $v_3$.

11. The method of claim 8, wherein generating a reference signal comprises reversing a polarity of the output reference voltage associated with an output phase is reversed if $v_{mid}$ is negative on the input phase corresponding to the output phase.

12. The method of claim 8, wherein generating the reference signal comprises:
   adding a zero sequence signal to each of the output reference voltages to provide modified output reference voltages; and
   selecting one of the modified output reference voltages as the reference signal.

13. The method of claim 12, wherein adding the zero sequence signal comprises selecting the zero sequence signal to extend a linearity of the switching functions by about 15.4%.

14. A system for controlling a matrix converter including a plurality of switching elements adapted to receive a multi-phase alternating current (AC) input signal having an input frequency and to generate a multi-phase AC output signal having an output frequency, the system comprising:
   a sorting module configured to sort the phases of the input signal as a function of instantaneous voltage amplitude of the input signal phases;
   a phase-locked loop for generating phase-locked input reference voltages based upon the input signal;
   a polarity module for determining polarity of an intermediate input phase voltage;
   a reference signal module configured to generate a reference signal from output reference voltages that correspond to each phase of the output signal;
   a duty cycle module to calculate duty cycle functions for each phase of the output signal based on the sorted input signal phases and the reference signal, and a current distribution factor based upon the polarity determined by the polarity module and the phase-locked input reference voltages; and
   a switching function module configured to generate switching functions based on the duty cycle functions for each phase of the output signal, wherein each switching function controls one of the switching elements.

15. The system of claim 14, wherein the sorting module is configured to associate each of the sorted input signal phases with the input signal from which it originated.

16. The system of claim 15, wherein the switching function module includes a demultiplexing module configured to sort the switching functions based on the associations of the sorted input signal phases from the sorting module.

17. The system of claim 14, wherein the switching function module is configured to calculate modulation functions based on the duty cycles and to comparing the modulation functions to a triangular comparison signal to generate the switching functions.

18. The system of claim 14, wherein the switching function module is configured to add a zero sequence signal to each of the output reference voltages to provide modified output reference voltages and to select one of the modified output reference voltages as the reference signal.

19. The system of claim 18, wherein the zero sequence signal extends a linearity of the switching functions by about 15.4%.

20. A method for controlling a matrix converter including a plurality of switching elements, the matrix converter adapted to receive a multi-phase alternating current (AC) input signal having an input frequency and to generate a multi-phase AC output signal having an output frequency, the method comprising:
   sorting the phases of the input signal as a function of instantaneous voltage amplitude of the input signal phases;
   generating a reference signal from output reference voltages that correspond to each phase of the output signal; wherein generating the reference signal comprises:
      adding a zero sequence signal to each of the output reference voltages to provide modified output reference voltages; and
      selecting one of the modified output reference voltages as the reference signal;
   calculating duty cycles for each phase of the output signal based on the sorted input signal phases and the reference signal; and
   generating switching functions based on the duty cycles for each phase of the output signal, wherein each switching function controls one of the switching elements.

21. The method of claim 20, wherein adding the zero sequence signal comprises selecting the zero sequence signal to extend a linearity of the switching functions by about 15.4%.

22. The method of claim 20, wherein generating the reference signal further comprises scaling and shifting the output reference voltage signals after adding the zero sequence signal to provide output signal voltages having amplitudes of about 86.6% of corresponding input signal voltages.

23. A method for controlling a matrix converter including a plurality of switching elements, the matrix converter adapted to receive an alternating current (AC) input signal having an input frequency with phase voltages $v_1$, $v_2$, and $v_3$ and to generate a multi-phase AC output signal having an output frequency, the method comprising:
   sorting input phase voltages $v_1$, $v_2$, and $v_3$ as a function of their instantaneous amplitudes such that $v_{max}$ is the input phase voltage with the highest amplitude, $v_{min}$ is the input phase voltage with lowest amplitude, and $v_{mid}$ is the input phase voltage with an amplitude intermediate $v_{max}$ and $v_{min}$;
   generating a reference signal from output reference voltages that correspond to each phase of the output signal; generating the reference signal comprises:
      adding a zero sequence signal to each of the output reference voltages to provide modified output reference voltages; and
      selecting one of the modified output reference voltages as the reference signal;
   calculating duty cycles $d_{min}$, $d_{mid}$, and $d_{max}$ based on input phase voltages $v_{min}$, $v_{mid}$, and $v_{max}$, respectively, and the reference signal;
   calculating modulation functions based on duty cycles $d_{min}$, $d_{mid}$, and $d_{max}$ for each output signal phase;
   comparing the modulation functions to a triangular comparison signal; and
   generating switching functions $s_{min}$, $s_{mid}$, and $s_{max}$ based the comparison between the modulation functions and the triangular comparison signal, wherein each of switching functions $s_{min}$, $d_{mid}$, and $s_{max}$ controls one of the switching elements associated with an output phase.

24. The method of claim 23, wherein adding the zero sequence signal comprises selecting the zero sequence signal to extend a linearity of the switching functions by about 15.4%.

25. A system for controlling a matrix converter including a plurality of switching elements adapted to receive a multi-phase alternating current (AC) input signal having an input frequency and to generate a multi-phase AC output signal having an output frequency, the system comprising:

a sorting module configured to sort the phases of the input signal as a function of instantaneous voltage amplitude of the input signal phases;

a reference signal module configured to generate a reference signal from output reference voltages that correspond to each phase of the output signal; wherein the switching function module is configured to add a zero sequence signal to each of the output reference voltages to provide modified output reference voltages and to select one of the modified output reference voltages as the reference signal;

a duty cycle module to calculate duty cycles for each phase of the output signal based on the sorted input signal phases and the reference signal; and a switching function module configured to generate switching functions based on the duty cycles for each phase of the output signal, wherein each switching function controls one of the switching elements.

26. The system of claim 25, wherein the zero sequence signal extends a linearity of the switching functions by about 15.4%.

* * * * *

UNITED STATES PATENT AND TRADEMARK OFFICE
CERTIFICATE OF CORRECTION

PATENT NO. : 8,259,474 B2
APPLICATION NO. : 12/600147
DATED : September 4, 2012
INVENTOR(S) : Vladimir Blasko It is certified that error appears in the above-identified patent and that said Letters Patent is hereby corrected as shown below:

Col. 2, Line 33
  Insert --,-- after "s21"

Col. 2, Line 47
  Delete "White"
  Insert --While--

Col. 3, Line 64
  Insert --,-- after equation

Col. 4, Line 17
  Insert --.-- after equation

Col. 5, Line 5
  Delete "*"

Col. 5, Line 64
  Delete "poi"
  Insert --pol--

Col. 5, Line 65
  Delete "pal"
  Insert --pol--

Col. 6, Line 11
  Delete "1"
  Insert --3-- after "and Δv"

Signed and Sealed this
Twentieth Day of November, 2012

David J. Kappos
*Director of the United States Patent and Trademark Office*